Patented Oct. 6, 1925.

1,556,326

UNITED STATES PATENT OFFICE.

WILHELM HERZBERG, OF BERLIN-WILMERSDORF, AND GERHARD HOPPE, OF BERLIN-TREPTOW, GERMANY, ASSIGNOR TO ACTIEN GESELLSCHAFT FÜR ANILIN FABRIKATION, OF BERLIN, GERMANY.

PROCESS FOR MANUFACTURING DYES.

No Drawing. Application filed December 12, 1924. Serial No. 755,551.

*To all whom it may concern:*

Be it known that we, WILHELM HERZBERG and GERHARD HOPPE, residing at Berlin-Wilmersdorf, Germany, and Berlin-Treptow, Germany, have invented certain new and useful Improvements in Processes for Manufacturing Dyes, of which the following is a specification.

We have found that valuable dyes may be obtained in a smooth manner by reduction of a substitution product of a compound of the following formula:

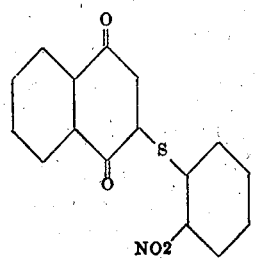

containing in the 2-position an OH-group and by ring closure. By the employment of an acid reducing agent the ring closure occurs during the reduction; otherwise it is effected subsequently by acidification.

The new dyes furnish on wool green chrom lakes of an excellent fastness to the action of light. If a 2-hydroxy-3 (2'-nitrophenylmercapto)-1.4-naphthoquinone is employed as starting material which contains in the benzene or in the naphthalene nucleus a sulphonic acid group water-soluble dyes are obtained. Water-insoluble dyes manufactured in the process described may be sulphonated.

The 2-hydroxy-3-(2'-nitrophenylmercapto)-1.4-naphthoquinone and its derivatives are obtainable by causing a 2-arylamino- or 2-acidylamino-3-chloro-1.4-naphthoquinone or a sulphonic acid thereof to react with 2-nitrothiophenol or a derivative thereof and heating the products with strong alkali so as to exchange the substituted amino group for hydroxyl. 2-hydroxy-3(2'-nitrophenylmercapto)-1.4-naphthoquinone is a bright orange red crystalline powder which melts at 245° C. and dissolves in concentrated sulphuric acid and in alkalies to an orange yellow solution. Addition of an excess of sodium hydroxide precipitates from the solution a sodium salt of brassy lustre. Treatment with feebly fuming sulphuric acid in the cold converts the naphthoquinone into an orange yellow sulphonic acid easily soluble in water.

The following examples illustrate the invention, the parts being by weight:

*Example 1.*—33 parts of 2-hydroxy-3-(2'-nitrophenylmercapto)-1.4-naphthoquinone are dissolved by means of 13 parts of sodium hydroxide solution of 40° Bé. specific gravity in 100 parts of cold water and the solution is mixed with about 7 parts of hydrosulphite until it is decolorized. Air is now passed through the liquid until it has become dark brown, whereupon it is acidified. The liquid solidifies, particularly easily when warmed, to a thick violet magma of the dye. The latter is a crystalline violet powder, soluble in concentrated sulphuric acid to a brown violet solution. In dilute alkali metal hydroxide solution it dissolves temporarily to a greenish blue solution from which the sparingly soluble dark blue alkali metal salt separates.

The formula of the dye produced by the foregoing example is

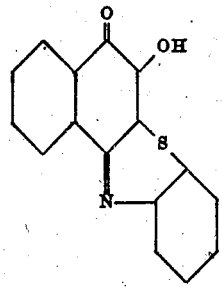

*Example 2.*—By substituting for the parent material used in Example 1 the 2-hydroxy-3(2'-nitro-4'-chlorophenylmercapto)-1.4-napthoquinone (a brownish yellow powder melting at 210° C. and obtained from 2-nitro-4-chloro-1-thiophenol) there is obtained a very similar thiazine derivative.

*Example 3.*—When the parent material used is 2-hydroxy-3(2'-nitro-5'-dimethylamino-phenylmercapto)-1.4-naphthoquinone (a brownish yellow crystalline powder obtainable from 2-nitro-5-dimethylamino-1-thiophenol by condensation in the manner described above and decomposed when heated to about 255° C.) there is obtained a dye which dissolves in concentrated sulphuric acid to a green solution, which on dilution with water passes to blue.

*Example 4.*—40 parts of the sulphonic acid obtainable by treating 2-hydroxy-3-(2'-nitrophenylmercapto)-1.4-naphthoquinone with feebly fuming sulphuric acid are heated for several hours at 90° C. with 400 parts of water and a solution of 26 parts of crystallized sodium sulphide and 3 parts of sulphur in 50 parts of water. There separates the sodium salt of a sulphonic acid in the form of steel blue needles which are filtered. By dissolving them in hot water and acidifying the greenish blue solution thus obtained the free sulphonic acid is obtained in the form of a red violet crystalline powder which dissolves to a blue red solution in hot water. The afterchromed dyeing on wool is blue green.

*Example 5.*—By substituting for the parent material of Example 4 the very similar 2-hydroxy-3-(2'-nitrophenylmercapto)-1.4-naphthoquinone-6-(7)-sulphonic acid (obtainable from 2-phenylamino-3-chloro-1.4-naphthoquinone-6 (7)-sulphonic acid, Journal für Praktische Chemie, vol. 37, page 190) there is obtained a dye which dissolves in water to a violet solution and in alkalies to a blue green solution; its after-chromed dyeings on wool are yellow green.

What we claim is,—

A process for manufacturing dyes of the general formula:

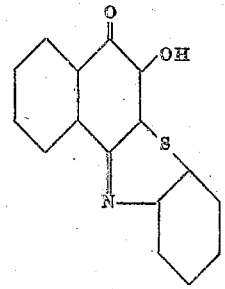

by treating with reducing agents compounds of the general formula:

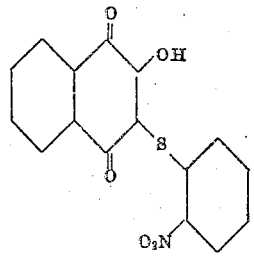

In testimony whereof we affix our signatures.

WILHELM HERZBERG.
GERHARD HOPPE.